United States Patent [19]

Schmidt

[11] Patent Number: 5,579,974

[45] Date of Patent: Dec. 3, 1996

[54] CYCLE AND/OR SKI RACK FOR MOUNTING ON VEHICLES

[75] Inventor: Erik K. Schmidt, Herning, Denmark

[73] Assignee: Erik Schmidt Autotilbehor ApS, Herning, Denmark

[21] Appl. No.: 407,596

[22] Filed: Feb. 2, 1995

Related U.S. Application Data

[63] Continuation-in-part of Ser. No. 379,597, Feb. 2, 1995.

[30] Foreign Application Priority Data

Nov. 2, 1993 [DK] Denmark .................. 1237/93

[51] Int. Cl.$^6$ ........................... B60R 9/10
[52] U.S. Cl. .................. 224/520; 224/495; 224/511
[58] Field of Search ........................ 224/520, 488, 224/495, 497, 500, 506, 507, 508, 511, 518, 519

[56] References Cited

U.S. PATENT DOCUMENTS

| | | | |
|---|---|---|---|
| 4,299,341 | 11/1981 | Copeland | 224/40.03 R |
| 5,011,361 | 4/1991 | Peterson | 224/497 |
| 5,121,862 | 6/1992 | Schmidt | 224/520 |

*Primary Examiner*—David J. Walczak
*Attorney, Agent, or Firm*—Antonelli, Terry, Stout & Kraus

[57] ABSTRACT

A cycle and/or ski rack for mounting on vehicles comprises a set of branches in V-shape (2, 3) interconnected at the acute end of the V-shape by a mutually spacing connecting link means (7). Mutually pivotable gripping and holding means (8A, 8B) are arranged at the connecting link means between the branches of the V-shape for gripping a holding device, such as a ball (1) associated with a trailer towing hitch behind a vehicle. The V-shape branches are held in a mutual position by a toggle joint-like cross link connection (4, 5, 6) comprising in particular two parallel link arms on at least one side of the toggle joint. A releasing arm (6A) is designed with an extension (6B) extending from the releasing arm in the direction of the releasing movement and is adapted with a further extension (6G) which extends further in below a member (45) positioned below the releasing arm in the area of the toggle joint mechanism.

22 Claims, 5 Drawing Sheets

5,579,974

1

CYCLE AND/OR SKI RACK FOR MOUNTING ON VEHICLES

This application is a continuation-in-part application of United States application Ser. No. 08/379,597, filed on even date, and still pending, entitled A Cycle and/or Ski Rack for Mounting on Vehicles and based upon PCT/DK94/00412, filed Nov. 2, 1994, which in turn is based upon Danish Application 1237/93, filed Nov. 2, 1993.

FIELD OF THE INVENTION

The present invention relates to a cycle and/or ski rack comprising a set of branches in V-shape interconnected at the acute end of the V-Shape by a mutually spacing connecting link means and having mutually pivotable gripping and holding means arranged at the connecting link means between the branches of the V-shape for gripping a holding device, such as a ball associated with a trailer towing hitch behind a means of transport, and wherein the V-shape branches, in order to enter into a clamping condition, are held in a mutual position by a toggle joint-like cross link connection comprising in particular two parallel link arms on at least one side of the toggle joint.

DESCRIPTION OF THE PRIOR ART

Such a known cycle and/or ski rack is shown in two embodiments in FIGS. 1 and 2 of the drawing. FIGS. 1 and 2 also show a trailer towing hitch designed as a ball, which is well-known and used as a towing means for, for example, a trailer towed by an automobile.

Description of the Prior Art

At the top, the cycle and/or ski rack supports protruding arms for carrying bicycles, or for acting as supporting means for skis, which may further be supported at the bottom by, for example, a basket-shaped receiving member, not shown.

Such a cycle rack and/or ski rack thus comprises two branches 2, 3, the lower ends 27, 37 of which are interconnected via a connecting link means, which is journal-connected with the branches 2, 3 at 71, 72. Two mutually opposite annular means 8A, 8B are arranged on the branches 2, 3 and are adapted to grip firmly and securely around a ball hitch 1 shown below in a stylized view and being mounted in the rear area of an automobile, not shown, for fixing the cycle rack to the ball 1 when the link arms 4, 5 of the toggle joint-like cross link connection are moved to their extended position and the branches 2, 3 are spread away from each other by this cross link connection and thus press means 8A, 8B firmly around the ball 1. As shown in FIGS. 5 and 6, such a known cycle rack may be designed with carrying arms 2A, 3A pivotally connected to the branches 2 and 3 so that the carrying arms are pivotable between two extreme positions, such as those shown in FIGS. 5 and 6.

In such a cycle and/or ski rack, a toggle joint mechanism of a type known per se may be used in the toggle joint-like cross link connection, and this mechanism is shown in a perspective view in FIG. 5 of the drawing and in more detail with the covering parts partially cut away in FIG. 6.

Such a mechanism, e.g. a toggle joint mechanism, which is adapted to hold the arms 4, 5 in an extended clamping position, is positioned at the journal which pivotally interconnects the arms 4, 5 and here comprises a joint or common pivot or journal pin 45 for the arms 4, 5. The arms are connected with the branches 2, 3 at journals 41, 51. When

2 the arms 4, 5, pivoting about these two latter journals 41, 51, are swung upwards, the common journal 45 is moved upwards as well, and the branches 2, 3, are pulled towards each other, and as they are pivoted about journals 71, 72, the means 8A, 8B are pulled apart and thus away from a supporting ball hitch 1 located between 8A, 8B, and the cycle rack may be removed from the ball hitch 1.

When the cycle rack is mounted on a ball hitch 1, 8A, 8B are clamped about the ball 1, as the common journal 45 for the arms 4, 5 is moved downwards until the arms 4, 5 take up the said extended position.

As this extended position is taken up, an automatic latch 64, 65 which is journal-pin-connected with, in this case, the arm 5, will, as appears from FIGS. 5 and 6, be pressed outwards in the longitudinal direction of this arm, as it passes and thus is influenced by a small transverse plate 46 firmly positioned in the arm 4, which is here designed as consisting of two parallel arms, and after passing the transverse plate 46 the latch will swing back under the influence of a spring 69 tensioned through passage of the transverse plate 46, and move into a holding engagement with the transverse plate 46 so that the arms 4, 5 remain in an extended position, until the automatic latch 64 is swung away from the transverse plate 46 and the common journal 45 between the arms 4, 5 is at the same time pushed upwards so that the extended clamping position is abandoned and the branches 2, 3 are moved towards each other by the arms 4, 5. The automatic latch 64 is released by exertion of a downward pressure on a short releasing arm 6A firmly connected with the latch. The latch and the releasing member, which here consists of the parts 64 and 6A including the journal 65, are generally designated by 6.

This known and widely used latch/toggle joint mechanism, however, presents some disadvantages in practice in connection with cycle racks. It is the object of the present invention to remedy these disadvantages.

As a cycle rack should not weigh too much, it is limited how heavily the arms and other parts of the mechanism may be manufactured, also taking into account that the amount of materials used should not be too large. However, in order that such a cycle rack can be firmly fastened to the ball hitch, the clamping force to be exerted manually downwards on the toggle joint arms in the area near the journal 45 is rather large, but on the other hand not larger than the people who are not in possession of a very large physical muscular force are also just able to position the cycle rack on the ball hitch 1 in a clamped condition. A cycle rack filled with bicycles is, however, so firmly fixed that even at rather high automobile speeds, such as about 140 km/hour and driving on a road full of potholes, a cycle rack, even loaded, is immovably fixed.

On the other hand, the materials of such a cycle rack are still not necessarily heavier than being slightly yielding, that is, it is possible to place one's fingers down between the releasing arm 6A and the arms 5, and if, by error, a sharp pull is exerted on the releasing arm 6A, it feels as if it gives way, and one could, but erroneously, believe that it is only necessary to exert a larger force to get the latch 64 to release itself from the transverse plate 46. A text affixed to the cycle rack to the effect that release is effected by a downward pressure on the releasing arm 6A may be lost in time or be impossible to read when it is dark, or when the person is not wearing his/her reading glasses, etc. In these manipulations it is possible to have fingers squeezed during the erroneous muscular efforts.

SUMMARY OF THE INVENTION

According to the invention, this problem has been solved by a cycle rack of the type mentioned in the introduction, in that the releasing arm is designed with an extension extending from the releasing arm in the direction of the releasing movement and is adapted with a further extension extending further in below a member positioned below the releasing arm in the area of the toggle joint mechanism.

Such a member may, according to the invention, be the pivot or the journal pin associated with the journal 45 between the arms 4 and 5.

The concept of the invention is that a suitable amount of free space is provided around the releasing arm 6A, still with a saving of material and yet resulting in a sufficient or unchanged mechanical strength sufficient for the cycle rack, so that one can freely manipulate it basically completely as before, but with the difference that if it is attempted to release the automatic latch by an upward pull in the releasing arm, it abuts the latter of the members, which member may be the pivot or journal pin 45 mentioned earlier as an example, which in this cycle rack is felt to be a hard, unyielding member, whereby the user of the cycle rack immediately understands by intuition that it is necessary to press downwards, viz. in the opposite direction, on the releasing arm to achieve release of the latch. At the same time, the extension device on the releasing arm 6A also screens the access to the inside of the toggle joint, which is an additional, that is, a secondary advantage attained.

BRIEF DESCRIPTION OF THE DRAWINGS

An embodiment according to the invention will now be described in further detail below with reference to the drawing, in which.

DESCRIPTION OF THE PREFERRED EMBODIMENTS

Figure 1:
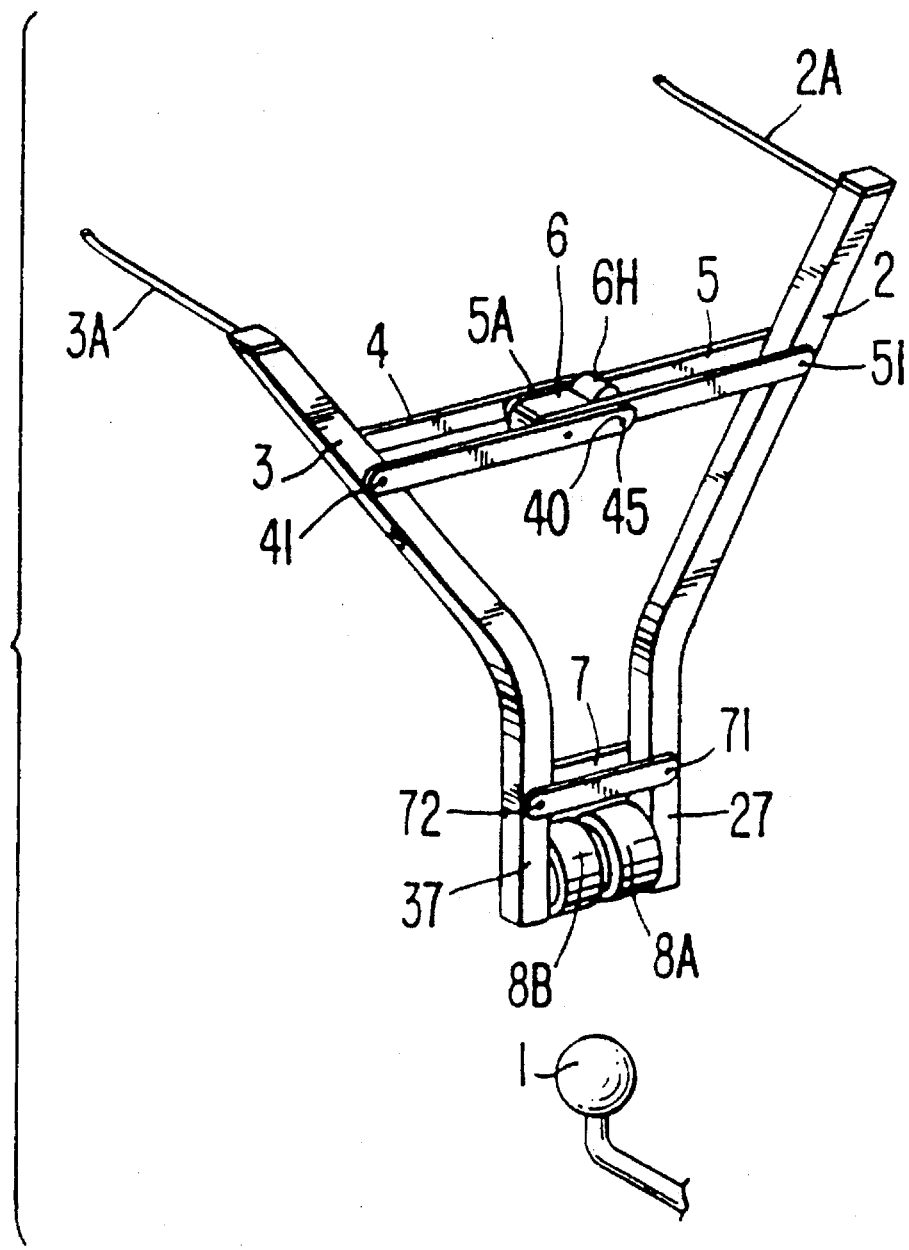
FIGS. 1 and 2 show two cycle racks of a known type.
Figure 2:
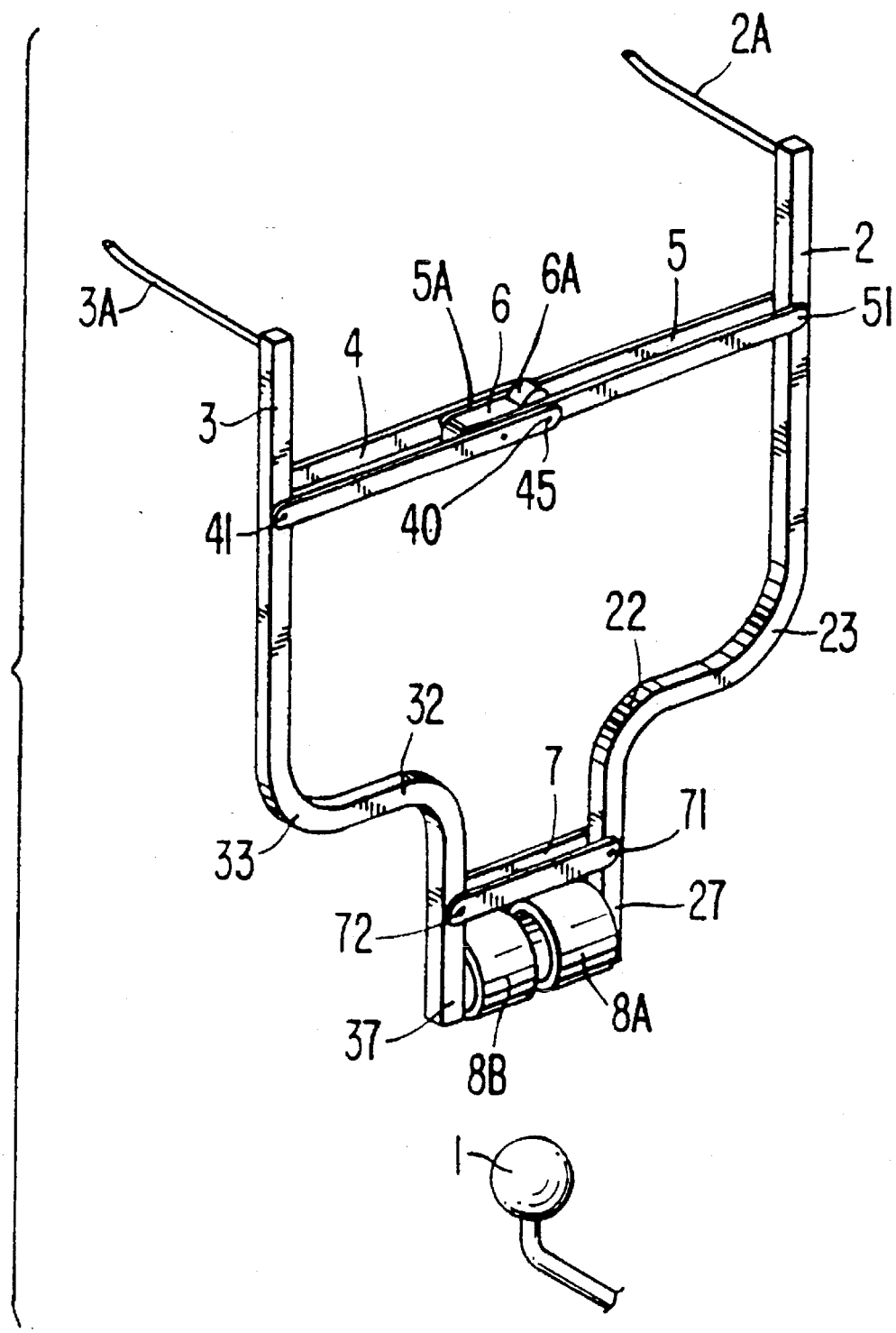
Figure 3:
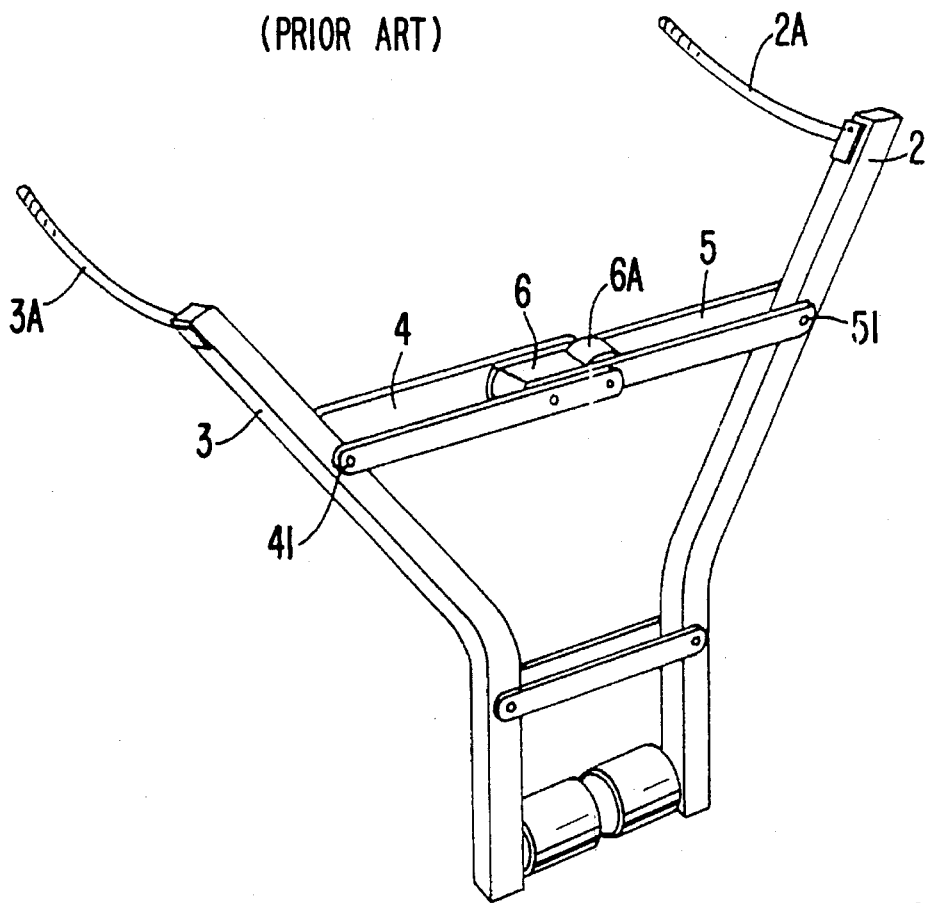
FIGS. 3 and 4 show a cycle rack as shown in FIG. 1 provided with pivotable carrying arms 2A, 3A.
Figure 4:
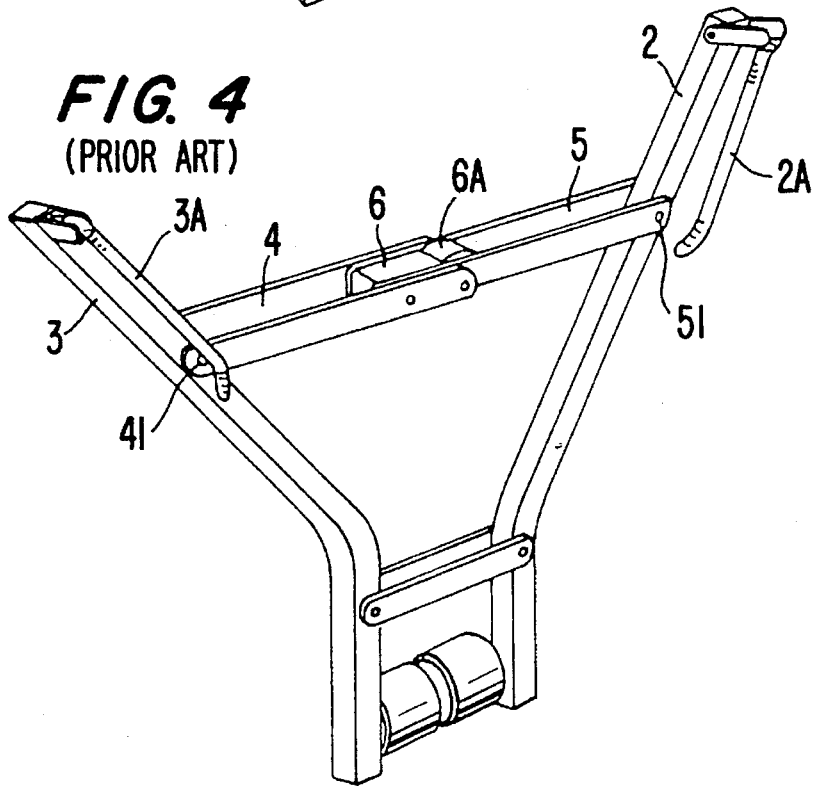
Figure 5:
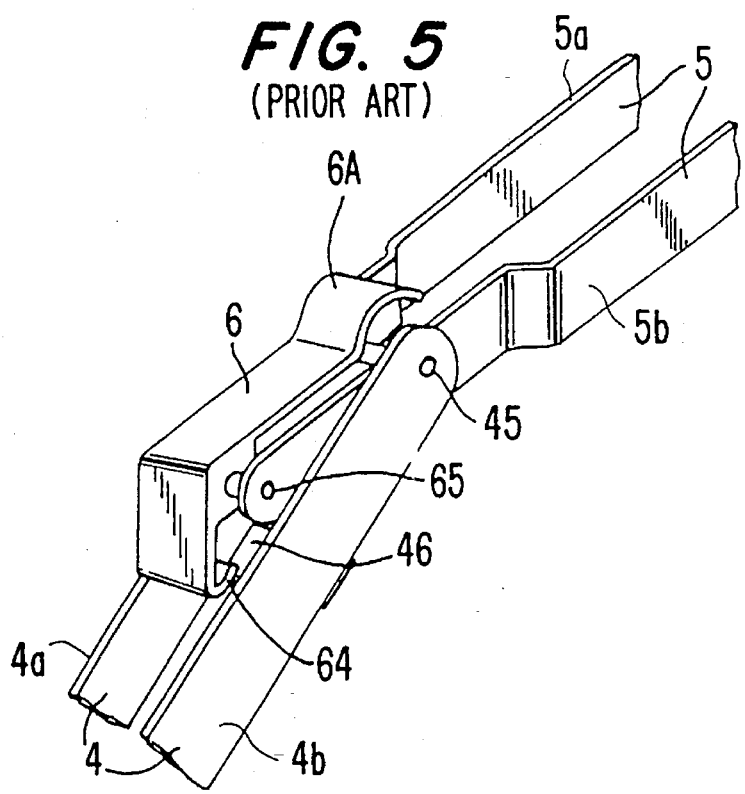
FIGS. 5 and 6 are perspective views seen from the outside and with covering members partially cut away, respectively, showing a toggle joint mechanism arranged between the arms 4 and 5.

In the figures of the drawing, similar components or components having the same function have the same reference numerals.

Figure 6:
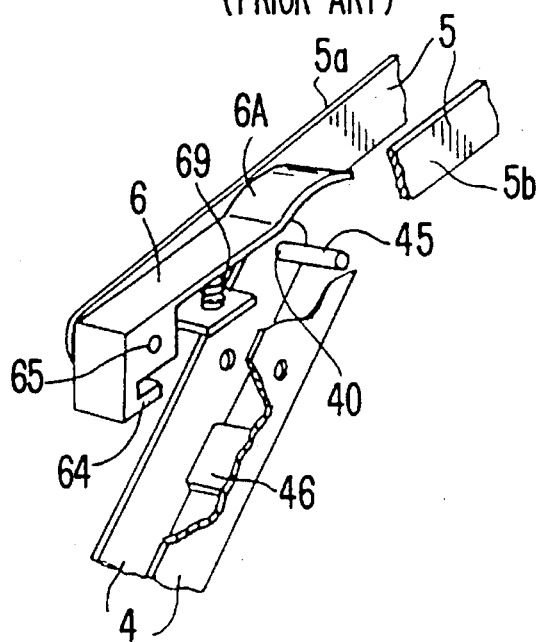
Figure 7:
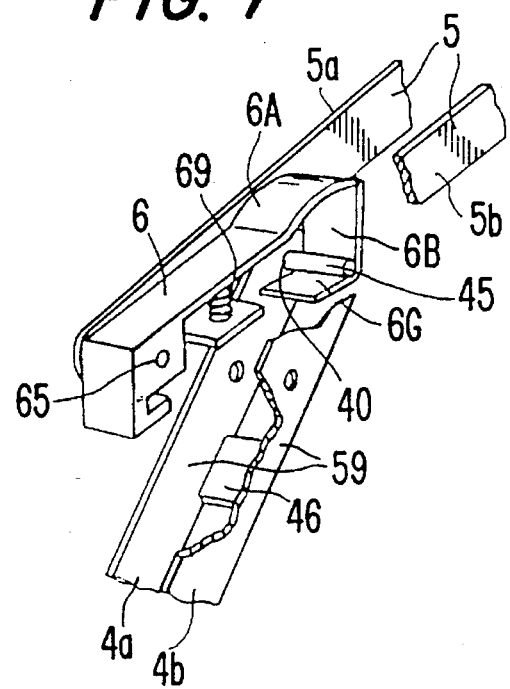
FIG. 7 shows a toggle joint mechanism designed according to the invention.

As the individual components of the cycle rack have already been quite completely described above with reference to FIGS. 1–6 of the drawing, it is only necessary to describe the embodiment chosen as an example of the invention and shown in FIG. 7 of the drawing.

The embodiment according to FIG. 7 differs from the design according to FIG. 6 in that the releasing arm 6A is designed with an extension 6B extending downwards into the free space between the two arm parts associated with the arm 5, which free space is located behind the toggle joint member 6 in the direction of view shown, which extension 6B has a further extension 6G which extends forwards and is adapted to be positioned immediately below the journal pin 45 when the releasing arm 6A including its extensions 6B and 6G takes up the position where the latch 64 is able to engage efficiently with the transverse plate 46.

The design achieved through the invention is also more attractive and user-friendly and in practice is also substantially easier to use, when the clamping of the cycle rack must be effected by the use of only one hand used to guide and at the same time actuate the clamping through a grip in the cycle rack in the area around the journal 45 between the arms 4, 5, so that safe use and operation of the cycle rack are obtained.

The safety is also increased, partly in the situation where the cycle rack is adapted in a known manner with pivotally arranged carrying arms 2A and 3A, and where these carrying arms must be pivoted from one extreme position to the other, as the user is not, in order to hold the cycle rack as a whole during the pivoting manipulations, tempted to place one hand wrongly so that a squeezing of the hand may occur in the area near the toggle joint mechanism. But the invention also prevents this from happening in the situation where, so as to have a hold on the cycle rack, the user has only managed, for practical reasons, to get a firm holding grip on for example one of these carrying arms, while the user is clamping or is opening the toggle joint mechanism with the other hand and an unintended pivoting movement of the carrying arm used for holding occurs at the same time. In this situation, increased safety against the hand being squeezed is obtained by the invention.

Figure 8:
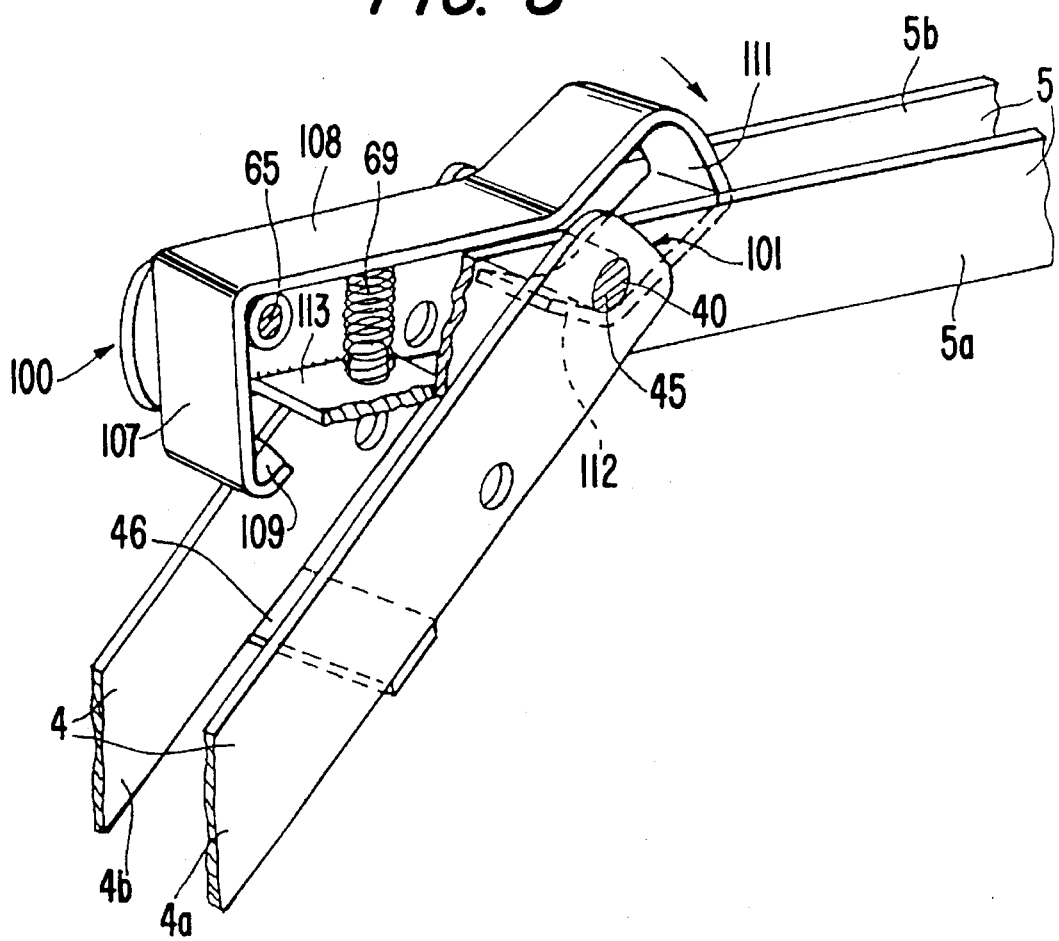
FIG. 8 and 9 are a perspective view and in partial section, respectively, showing a second embodiment of a toggle joint mechanism according to the invention.

The embodiment shown in FIGS. 7 and 8 is designed with the aim of obtaining a foolproof operation of the toggle joint without risk of enjury to fingers etc. The first link arm 5 and the second link arm 4 each comprise two side pieces 4a, 4b and 5a, 5b which are elongated plate strips having sufficient strength and stiffness to press the branches apart when the toggle joint is pressed down into the clamping condition. The link arm 5 has opposite its journal or bearing point 51 a free end 100. At a distance from this free end 100 the second link arm 4 is at a similar free end 101 interconnected with the first link arm by a pin means interted through overlapping through bores 40 in the four side pieces. The pin means 45 may be a bolt, a split, a screw, or a similar pin-like means. The pin means 45 acts as a bearing or pivot and has a longitudinal axis extending in parellel with the longitudinal axes of the journals or bearings 41, 51.

The two branches 2, 3 extend in a common plane and they are moved in this plane when the toggle joint is shifted between its two extreme positions. When the toggle joint is moved towards its extended position the free end of the first link arm is swung down between the two side pieces 4a, 4b until the lower side of the side pieces 5a, 5a abut the upper side of lock piece 46 which is fixed to the second link arm.

Access by the fingers to the area between the two side pieces 5a, 5b in an end region of the first link arm is prevented by a shield in the form of a lever 106 which is welded onto a piece of pipe being journalled on a pin 65 which is mounted on the first link arm at its free end and at its upper side. It is also possible to affix two pins to the lever and to insert these pins in associated holes in the side pieces of the first link arm. Pin 65 acts as fulcrum for the lever.

A first lever arm 107 extends from the fulcrum down to an angled portion or a locking means 109 pointing obliquely upwards and towards lock piece 46.

Figure 9:
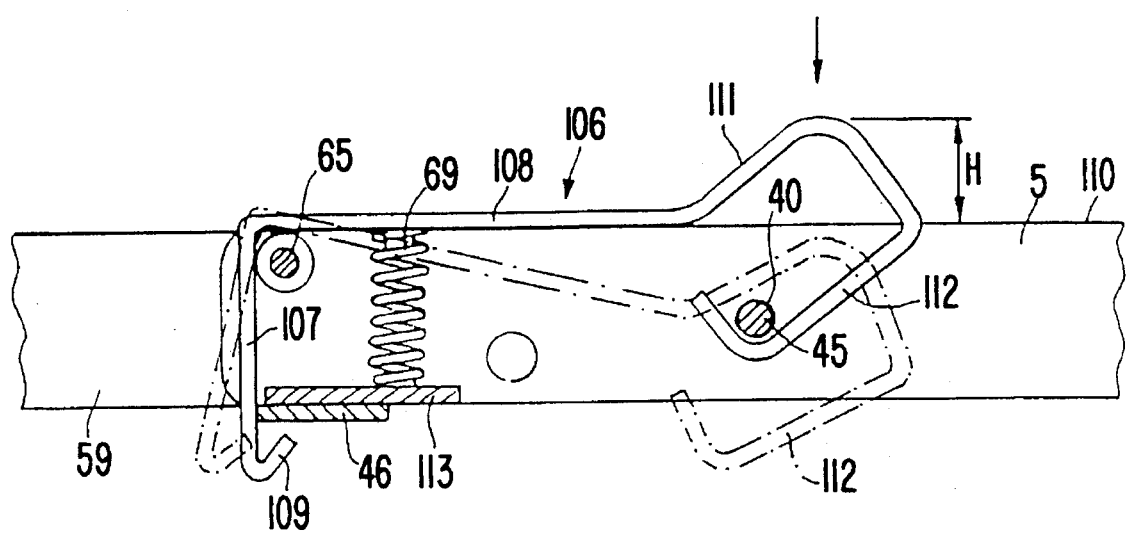

A second lever arm 108 extends, in the resting position shown in solid lines in FIGS. 8 and 9, from the fulcrum along the upper edge 110 of the first link arm and continues into a curved portion 111 which protrudes upwards to a maximum height indicated by H and then declines to the original level. The curved portion 111 merges into an engagement member 112 which extends towards the first lever arm and passes down below pin means 45. The height of the curved portion is less than a height of the link arm.

A preloaded compression spring 69 is positioned between the underside of second lever arm 108 and a spring guide or spring stop means 113, such as a piece of plate fixed to the first link arm, e.g. by welding. When the toggle joint is in the unlocked condition shown in FIG. 8, the spring 69 holds the lever in the resting or neutral position with the engagement member 112 abutting pin 45 which absorbs the spring action. When the rack is mounted on ball 1 and the toggle joint is pressed down to the extended position, the oblique locking means 109 hits the upper left hand corner of locking piece 46 and forces the lever to turn about fulcrum 65 until locking means 109 snap in below locking piece 46 and the lever enters into the position shown in FIG. 9 where the side of first lever arm 109 abuts the end of locking piece 46.

Removal of the rack from the ball 1 requires releasing of the lock of the toggle joint and an upwards pull in the latter in order to swing link arms 4, 5 upwards and bring the upper ends of the branches closer to each other. Consequently, one could easily expect to release the rack by an upward pull in the raised portion 111. However, exactly the opposite action is required, namely a depression of the raised portion down the position shown in broken lines in FIG. 9, so that locking means 109 gets clear of lock piece 46 and allows the link arms to be swung up. If an upwards pull is effected in second lever arm 108, one would immediately sense that a swinging movement opposite to the releasing direction is prohibited by the engagement between stop 45 and engagement member 112. If a small gap exists between stop 45 and engagement member 112 when the link arms are in fully extended position, the user performing the prohibited upward pull in the lever will feel a short movement and then the sudden stopping when member 112 engages stop 45. This immediately tells the user to effect the opposite action on the lever.

The height H shown in FIG. 9 of the curved portion is preferably so large that the locking means is clear of locking piece 46, i.e. in unlocked position, when the top of the curved portion is depressed on level with the upper edge 110 of first link arm 5. This greatly facilitates use of the rack because it is uncomplicated to unlock. The curved portion 111 and the engagement member 112 preferably together spans or extend over a height which is larger than the height of first link arm 5, preferably at least 25% larger. This enhances secure manipulation. When the rack is to be released the user will normally with one hand gripped about one link arm press down on the top of curved section 111 with the thumb while holding the index finger against the lower side of the link arm. Then the user has to hold the lever in the released position and pull up the toggle joint. The mentioned height of portion 111 and member 112 cause the latter to protrude down below link arm 5 when portion 111 is depressed and to lift the index finger from the lower side. Thus, the user will remember to remove the index finger before the toggle joint is collapsed and the risk of squeezing the finger in the scissor like link arms is prevented.

Optimum protection against damage to fingers is obtained when the first and second lever arms 107, 108, the locking means 109, said curved portion 111 and said engagement member 112 is formed of a single piece of stiff strip material, e.g. of metal or steel plate, and when the strip has a width being only a little less than the distance between the two side pieces 5a, 5b. Such a strip can easily be manufactured by bending a straight piece of strip without rough junctions or exposed edges which could otherwise injure the skin or rip garments. Further, because the strip width is adjusted to the gap between the two side pieces, fingers can not be squeezed in between the lever and one of the side pieces.

I claim:

1. A carrier rack for mounting a holding device on a vehicle comprising:

a pair of branches each having an upper end and a lower end and arranged in V-shape;

a connecting link means connecting said pair of branches;

gripping and holding means provided on the branches at a position between the connecting link means and said lower ends; and a toggle joint link provided on the branches at a position between the connecting link means and said upper ends so that the toggle joint link can be manipulated between an extended position where said upper ends of the branches are held apart and the gripping and holding means are in a clamping position, and an inactive position where said upper ends are closer to each other and the gripping and holding means are in a released position; wherein said toggle joint link includes a first link arm pivotally connected to one of the branches of said pair of branches and a second link arm pivotally connected to the other of the branches, a locking means carried by said first link arm locking said second link arm in said extended toggle joint link position, a lever journalled in said first link arm and having a first lever arm carrying said locking means and second lever arm swingable in a releasing direction in order to release said locking means, a stop mounted on said first link arm, an engagement member positioned on said second lever arm and said engagement member restricting swinging of the second lever arm in a direction opposite to said releasing direction by engagement with said stop.

2. A carrier rack as claimed in claim 1 wherein:

said lever arm is spring loaded towards a position where said locking means locks said second link arm.

3. A carrier rack as claimed in claim 1 wherein:

said stop is a bearing pin interconnecting said first and second link arms.

4. A carrier rack as claimed in claim 3 wherein:

said engagement member is an extension of said second lever arm and said extension has a curved portion.

5. A carrier rack as claimed in claim 4 wherein:

said curved portion is raised above said first link arm to such a height when the lever holds the locking means in locked position that the locking means is released when said curved portion is depressed to a level identical to a level of said first link arm.

6. A carrier rack as claimed in claim 5 wherein:

said extension continues from said raised curved portion in a angled portion running towards said first lever arm so that the extension both runs above and below said bearing pin.

7. A carrier rack as claimed in claim 5 wherein:

said first link arm has a height, and said raised height of said curved portion is less than the height of said first link arm.

8. A carrier rack as claimed in claim 1 wherein:

said first and second lever arms are mutually angled at the point of journalling to said first link arm so that the first lever arm extends down below said first link arm and the second lever arm extends in parallel with said first link arm when the locking means is in locked position.

9. A carrier rack as claimed in claim 1 wherein:

said first and second lever arms, said locking means, and said engagement member are formed of a single piece of strip material.

10. A carrier rack for mounting a holding device on a vehicle comprising:

a pair of branches extending in a common plane, each branch having an upper end and a lower end;

a connecting link means connecting said pair of branches;

gripping and holding means provided on the branches at a position between the connecting link means and said lower ends;

a toggle joint link provided on the branches at a position between the connecting link means and said upper ends so that the toggle joint link can be manipulated between an extended position where said upper ends of the branches are held apart and the gripping and holding means are in a clamping position, and an inactive position where said upper ends are closer to each other and the gripping and holding means are in a releasing position; wherein said toggle joint link includes a first link arm pivotally connected to one of the branches in said pair and a second link arm pivotally connected to the other of the branches, each link arm comprising two elongate side pieces extending in parallel with said common plane along a major portion of their length and being spaces apart, a locking means carried by said first link arm and being able to lock said second link arm in said extended toggle joint link position, a lever journalled in said first link arm between its two side pieces and having a first lever arm carrying said locking means and a second lever arm which can swing in a releasing direction in order to release said locking means, a stop mounted on said first link arm between its two side pieces, an engagement member positioned on said second lever arm and the engagement member restricting swinging of the second lever arm in a direction opposite to said releasing direction by engagement with said stop.

11. A carrier rack as claimed in claim 10 wherein:

a lock piece is fixed to said two side pieces of said second link arm so that the lock piece extends from one side piece towards another side piece, and said first lever arm abuts said lock piece when the toggle joint is in the extended locked position.

12. A carrier rack as claimed in claim 11 wherein:

said lever arm is spring loaded towards said position with the first lever arm abutting said locking piece by a pretensioned spring which is positioned between the second lever arm and a spring guide fixed to the first link arm.

13. A carrier rack as claimed in claim 11 wherein:

said stop is a pin means interconnecting said first and second link arms.

14. A carrier rack as claimed in claim 13 wherein:

said second lever arm at its end opposite said first lever arm continues into a curved portion and further on into said engagement member.

15. A carrier rack as claimed in claim 14 wherein:

said curved portion is raised above said first link arm to such a height when said first lever arm abuts said lock piece that the locking means is released when said curved portion is depressed to a level identical to a level of said first link arm.

16. A carrier rack as claimed in claim 14 wherein:

said curved portion passes above said stop and said engagement member passes below said stop.

17. A carrier rack as claimed in claim 16 wherein:

said first link arm has a height, and said curved portion and said engagement member together span a height which is at least 25 percent larger than the height of said first link arm.

18. A carrier rack as claimed in claim 10 wherein:

said first and second lever arms are mutually angled at the point of journalling to said first link arm so that the first lever arm extends down below said first link arm and the second lever arm extends in parellel with said first link arm when the locking means is in locked position.

19. A carrier rack as claimed in claim 10 wherein:

said first and second lever arms, said locking means, and said engagement member are formed of a single piece of strip material.

20. A carrier rack as claimed in claim 19 wherein:

the strip material has a width less than a distance between said two spaced apart side pieces of said first link arm.

21. A carrier rack as claimed in claim 20 wherein:

said first link arm has an upper edge and a free end opposite the pivotal connection to the branch, said lever is journalled at said free end, said first lever arm extends between and down below said two side pieces, said second lever arm extends along said upper edge and merges into an upwards protruding curved portion passing by said stop, which curved portion continues into said engagement member, which member, on a side of the stop nearest to said branch, passes down between said two side pieces in a direction towards said first lever arm, so as to bar unintentional manual access to the area surrounding the stop.

22. A carrier rack as claimed in claim 20 wherein:

a gap exists between said stop and said engagement member when the link arms are in the locked fully extended position.

\* \* \* \* \*